S. A. GASDA AND D. R. CAHILL.
GRAPHIC RECORDING MECHANISM FOR SPINNING MACHINES.
APPLICATION FILED FEB. 24, 1921.
1,397,578.
Patented Nov. 22, 1921.
4 SHEETS—SHEET 1.
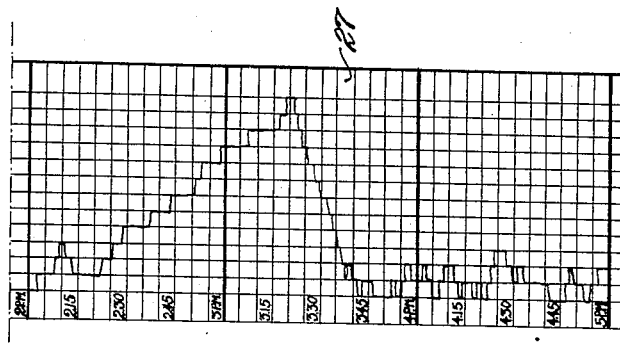
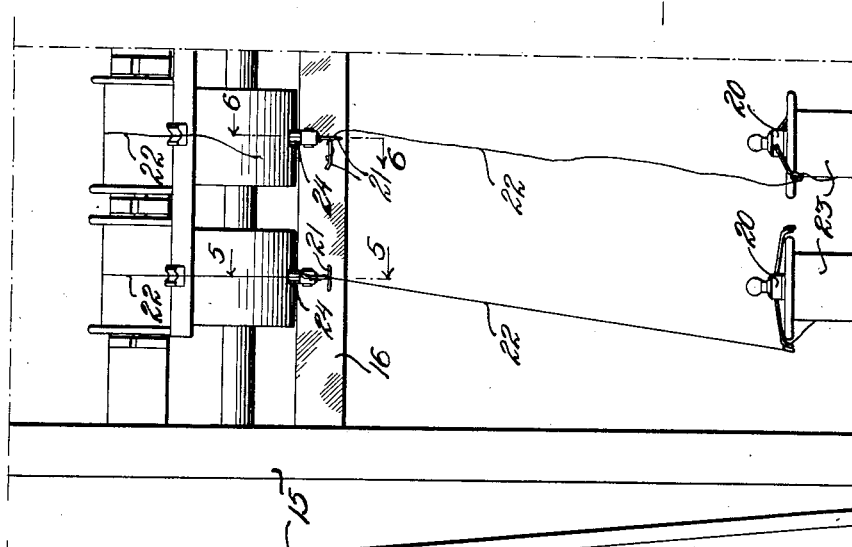
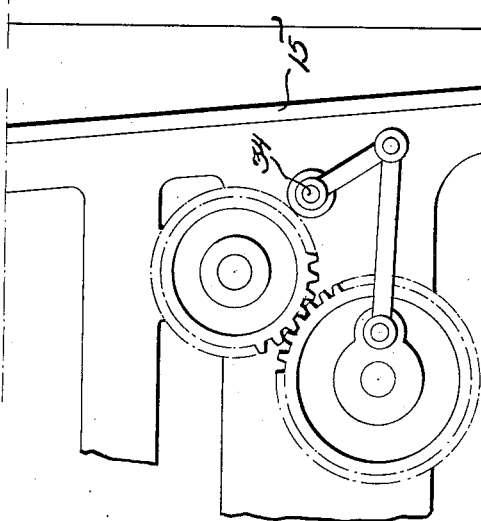

S. A. GASDA AND D. R. CAHILL.
GRAPHIC RECORDING MECHANISM FOR SPINNING MACHINES.
APPLICATION FILED FEB. 24, 1921.
1,397,578.
Patented Nov. 22, 1921.
4 SHEETS—SHEET 2.
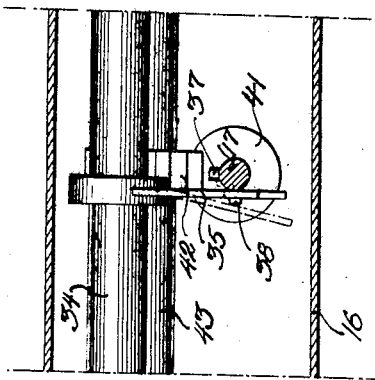
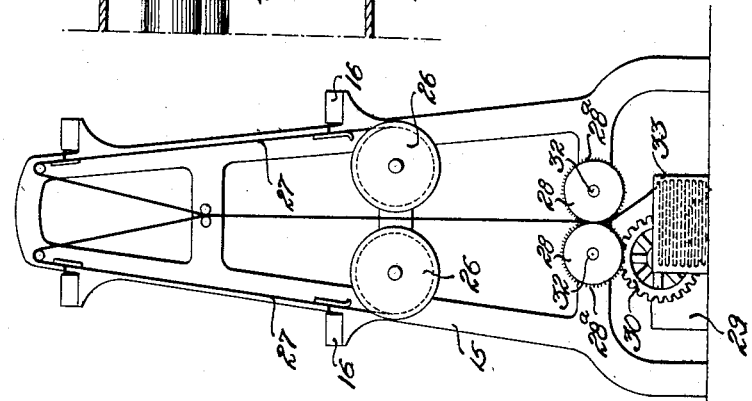
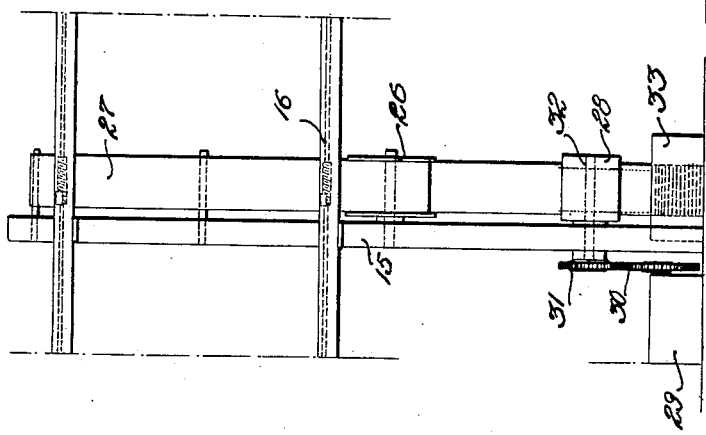

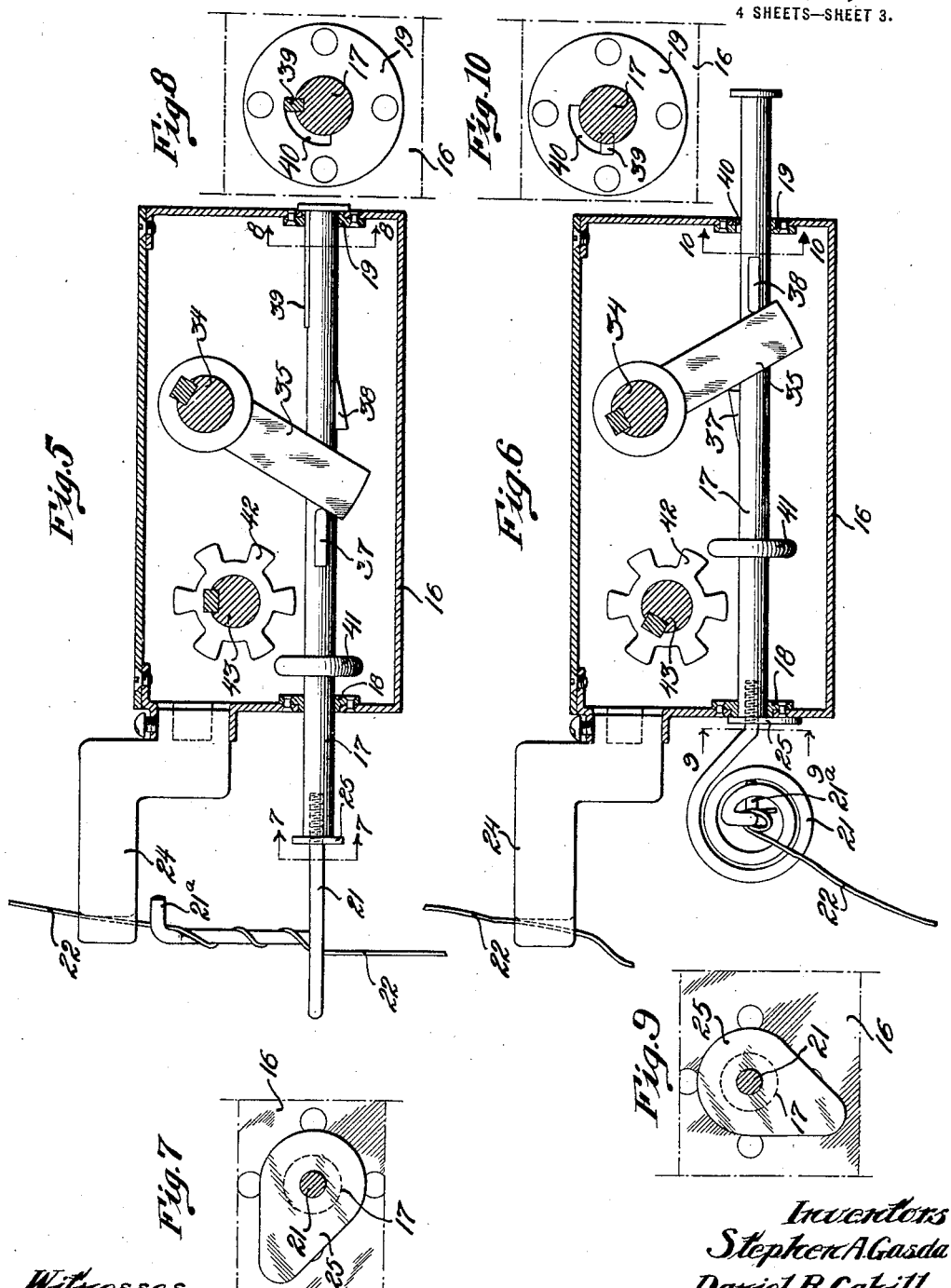

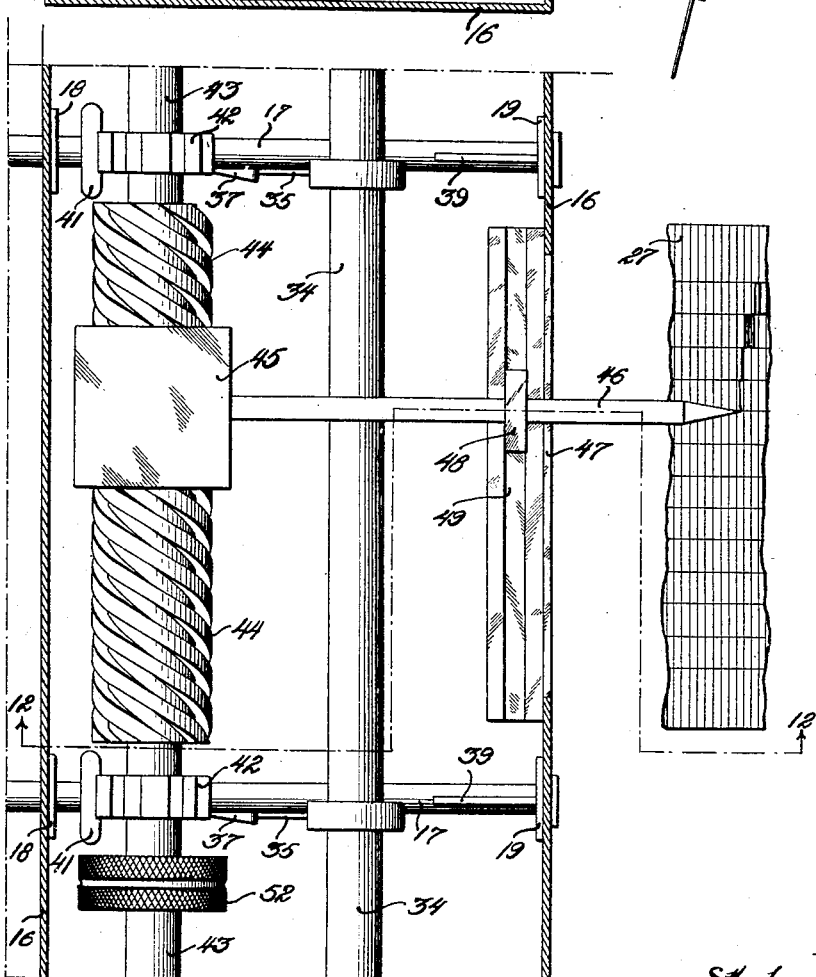

UNITED STATES PATENT OFFICE.

STEPHEN A. GASDA AND DANIEL R. CAHILL, OF BETHLEHEM, PENNSYLVANIA.

GRAPHIC RECORDING MECHANISM FOR SPINNING-MACHINES.

1,397,578. Specification of Letters Patent. Patented Nov. 22, 1921.

Application filed February 24, 1921. Serial No. 447,393.

*To all whom it may concern:*

Be it known that we, STEPHEN A. GASDA and DANIEL R. CAHILL, citizens of the United States, residing at Bethlehem, county of Northampton, and State of Pennsylvania, have invented certain new and useful Improvements in Graphic Recording Mechanism for Spinning-Machines, of which the following is a specification.

One object of our invention is to provide means which will accurately produce a record of the running conditions of a spinning machine or the like so that the head of a mill or other appointed person can determine how the machine is running, when an end breaks, when the end is tied up, and other features by which he can determine whether the operator keeps the machine working to its full capacity and is properly attentive.

Another object is to so construct our improved mechanism that it cannot be tampered with without detection by the operator of the machine.

A further object is to make the mechanism of our invention of a comparatively simple construction and so that it cannot readily get out of proper working order.

These objects, and other advantageous ends which will be described hereinafter, we attain in the following manner, reference being had to the accompanying drawings in which—

Figure 1 is a front elevation of a portion of a spinning machine having thereon the mechanism of our present invention, Fig. 2 is a fragmentary side elevation showing certain of the mechanical operating parts for imparting an oscillating movement to a shaft which forms a part of our invention, Fig. 3 is an elevation diagrammatically illustrating how our invention can be adapted to a machine including a plurality of tiers.

Fig. 4 is a side elevation of Fig. 3,

Fig. 5 is an enlarged fragmentary section taken on the line 5—5 of Fig. 1 showing parts of our invention in their normal position, Fig. 6 is a fragmentary section taken on the line 6—6 of Fig. 1 showing an end of yarn having broken; the parts having been automatically operated to produce a record of the breaking of said end of yarn, Fig. 7 is a section slightly enlarged and taken on the line 7—7 of Fig. 5, Fig. 8 is an enlarged section taken on the line 8—8 of Fig. 5, Fig. 9 is an enlarged section taken on the line 9—9 of Fig. 6, Fig. 10 is an enlarged section taken on the line 10—10 of Fig. 6, Fig. 11 is a fragmentary sectional plan view through one of the recording rolls and illustrating the mechanism which forms a marking on a graphic chart, Fig. 12 is a section taken on the line 12—12 of Fig. 11, Fig. 13 is a fragmentary longitudinal section showing in full lines the normal operating position of an oscillating arm which forms a part of our invention, and in dot-and-dash lines a possible flexed position of said arm into which it can be bent if the yarn guide is pulled outward when the oscillating arm is in a position to the rear of its full forward position, and Fig. 14 is a view showing a graphic chart which forms a part of our invention and illustrating a marked record thereon which shows possible conditions of a machine between one time and another.

Referring to the drawings, 15 represents a spinning machine, such for example as a silk spinning machine, which may be of any usual construction but in which we substitute, instead of the usual yarn guide rail, a hollow yarn guide rail 16 which extends in the direction of the length of the machine as clearly illustrated in Fig. 1. In this hollow rail 16 we mount a number of shafts 17; the rail having bearings 18 and 19 at its front and rear in which the shafts 17 are journaled as clearly shown in Figs. 5 and 6. As illustrated the arrangement is such that there is one of the shafts 17 for each spindle 20. Each of the shafts 17 has a yarn guide 21 screwed therein and the ends of yarn 22 respectively pass through the yarn guides 21 and to the bobbins 23; overhead guides 24 being provided as shown in Figs. 1, 5 and 6 so that under normal operating conditions the yarn passes through the guides 21 and holds them in a predetermined position and thereby holds the shafts 17 in predetermined positions. We preferably provide the shafts 17 with weighted collars 25 which under normal conditions, as shown in Fig. 7, serve to partially rotate the shafts 17 if any of the ends of yarn break such for example as shown at the right hand side of Fig. 1 and also in Fig. 6. We may use any of the well known form of yarn guides such for example as the "pig-tail" guide or the spiral guide as illustrated and we wish it understood that any form of yarn guide can be used for the yarn guides 21 which will hold the yarn ends in a predetermined position while the yarn is normally passing therethrough and which can partially rotate when the ends of yarn break so as to permit the counter-weight collars 25 to partially rotate the shafts 17.

A supply roll 26 of chart paper 27 may be mounted in any convenient position on the frame of the machine so as to have a portion extending to the rear of the rail 16 and this chart paper after passing over suitable guides extends between two feed rolls 28 which are operated by clock work mechanism which may be placed within a box 29 and locked therein by any suitable means.

In the present instance we have illustrated a wheel 30 rotated by clock or time operated mechanism within the box 29; said wheel 30 driving a wheel 31 on a shaft 32 upon which one of the rolls 28 is secured. It will thus be noted that the chart paper will be moved relatively to the rail 16 by the time mechanism and we preferably provide a box 33 or other suitable receptacle below the rolls 28 to receive the record paper after having been marked upon by mechanism hereinafter described.

An oscillating shaft 34 is positioned within the rail 16 as shown in Figs. 5 and 6 and this shaft can be oscillated by any suitable mechanism, such for example as that illustrated in Fig. 2; said mechanism being timed and connected in any suitable manner with an operative part of the machine. Thus the shaft 34 will receive a constant operating movement. Arms 35 which are laterally flexible but rigid in the direction from front to rear, as shown in Fig. 5, are secured to the shaft 34 and respectively positioned adjacent the shafts 17. Each of the shafts 17 has two lugs 37 and 38 which are spaced apart, one forward of the other and arranged substantially at 90° with respect to the axes of the various shafts 17 as clearly shown in Figs. 5 and 13. When the shafts 17 are in their normal positions as shown in Fig. 5 the lugs 37 will project from the side thereof and the lugs 38 will project from the bottom. These lugs 37 and 38 have their outer edges slanting in opposite directions. During normal conditions the arms 35 oscillate to the rear of the lugs 37 and since the lugs 38 are at the bottoms of the shafts 17, the arms 35 will not effect any movement of the shafts 17. The shafts 17 adjacent their rears have keys or lateral extensions 39 which extend through arcuate notches 40 of the bearings 19; said arcuate notches extending through an arc of substantially 90°.

Also each of the shafts 17 has an annular collar or flange 41 adapted under certain conditions to engage the lowermost tooth of a toothed wheel 42; there being preferably one of the toothed wheels 42 adjacent each shaft 17. These wheels 42 are secured to a recording shaft 43; said recording shaft having a worm 44 thereon as shown in Figs. 11 and 12 with which meshes a threaded shoe or partial nut 45 from which projects a marker 46. This marker 46 may extend out of a slot 47 in the rail 16 and engage the chart paper 27. Any suitable guiding means may be provided for the marker such for example as an enlargement 48 on the marker which slides within a guideway 49 in the rail 16 all as shown in Figs. 11 and 12. The worm 44 can be made of any length desired to suit the width of the chart paper 27 and greater than that necessary for recording the normal operation of the machine for a reason clearly obvious from the following description of the operation of the mechanism.

In Figs. 3 and 4 we have illustrated our invention as applicable to a machine having two rails 16 on each side. However, it will be understood that our improved mechanism can be employed on a machine having one or more rails co-acting with one or more rows of spindles. The record chart paper 27 can be lined and appropriately marked within its length to represent time divisions as shown in Fig. 14 and as previously stated this paper moves by the time controlled mechanism relatively to the marker 46 so that during a movement of the chart paper the marker will produce a line marking upon said paper. If all of the ends of yarn are properly passing continuously through their guides, the marker will inscribe a straight vertical line on the chart paper, as is obvious from the construction illustrated and above described. If, however, the worm 44 is rotated it will move the marker 46 in the direction of the length of the rail 16 and will inscribe a line transversely on the chart paper.

We will now describe how the breaking of one or more ends of yarn 22 effects a rotation of the worm 44 to cause said transverse marking on the chart paper.

Considering that the parts are in their normal positions, as shown in Fig. 5, if an end of yarn breaks, the respective counter-weight collar 25 will rotate its shaft 17 until the extension 39 abuts the lower wall of the notch 40. The adjacent arm 45, during its next rearward oscillation, will then engage the forward end of the lug or projection 38 which has been moved, due to the turning of the shaft 17, into the plane of movement of the arm 35 and the shaft 17 will then be slid rearwardly so that the flange 41 will strike the lower tooth of the adjacent wheel 42 and the shaft 43 will be partially rotated as will also be the worm 44. This action will cause the marker to be moved laterally in one direction to inscribe a lateral marking on the record paper.

Fig. 6 shows the position of the parts after the arm 35 has moved the shaft 17 as above described and the flange 41 has moved said lower tooth and has cleared the wheel 42 so that if another end should break before the operator tied in the end just described as having been broken, the shaft 43 will be free to be rotated by another flange 41 without being interfered with by the previously moved flange 41. When an operator ties in a broken end he or she merely places the end back of the extension 21ª of the guide and the tension from the whirl of the spindle will automatically turn the yarn guide into its normal position. When the yarn guide is thus turned it will rotate the shaft 17 so that the arm 35 on its forward oscillation will push the shaft outwardly through the medium of the projection 37 and during this outward movement of the shaft the flange 41 will engage the lower tooth of the adjacent wheel 42 and rotate it to the extent of one tooth in an opposite direction. This reverse movement imparted to the wheel 42 will cause the marker 46 to mark a line on the record paper 27 transversely in an opposite direction and will show that the end has been tied. It will thus be seen that the transverse markings in one direction will indicate a record of the ends when they break and that the transverse marking in an opposite direction will indicate when the ends have been tied. Since the paper of the chart moves by the time-controlled mechanism, the spaces between the transversely ruled chart lines will indicate just when the break or tie occurred so that it is possible for the owner of a mill or any person appointed for that purpose, to clearly and definitely ascertain under what conditions the machine has run during the day or any part of the day. The mechanism within the rail may be inspected or adjusted by the proper person and we have illustrated the top of the rail being hinged at 50 as shown in Fig. 12 and provided with a lock 51 so that the proper person can open the top of the rail to gain access to the interior thereof. We have provided the shaft 43 with a hand wheel 52 so that the marker can be initially set since it will be noted that by rotating the shaft 43 by means of the hand wheel 52 that the worm 44 will be rotated to move the marker into its starting position or if for any other reason it is desired to start the marker at any particular part of the chart the same can be accomplished by the proper person turning the wheel 52. If, during the tying of an end, the guide should be turned into its normal position while the adjacent oscillating arm is midway between its possible limits of movement, the slanting or beveled character of the outer edge of the projection 38 will merely flex the arm 35 laterally as shown in dot-and-dash lines in Fig. 13 so that none of the parts will be broken and when the arm starts its forward movement the shaft 17 will be pushed outwardly in a proper manner.

The rolls 28 are preferably provided with needle points 28ª, the function of which is to grip the record paper and insure a positive feeding thereof.

We have described our invention as being applied specifically to a spinning machine. However, it will be noted that our invention can be used, with the advantage noted, in various types of yarn spinning, roving, doubling or twisting machines, etc. where yarn passes through guides and when broken must be again tied by the operator.

It will be of course understood that the tension of the yarn normally passing through the movable guides 21 holds them in their normal position and also holds the shafts 37 in their normal positions and when this tension is released by the breaking of the yarn that the shafts 17 and yarn guides will automatically rotate for a part of a full revolution as prescribed by the extent of the notches 40.

It is thus obvious that even though our invention is applied to a machine it will not require any additional work on the part of the operator since the operator can go about his or her work in the usual manner and will not be concerned with any of the parts of our invention.

Another advantageous feature of our invention is that it will enable the purchaser of the yarn coming from the machine to judge its running quality since the purchaser can readily determine from the record the running qualities of the yarn.

Furthermore if the invention is used on a machine having a plurality of tiers, the various records can be made by employing marking fluid of different colors so that the record of the running of each individual tier can be readily ascertained.

While we have described our invention as taking a particular form, it will be understood that the various parts of our invention may be changed without departing from the spirit thereof, and hence we do not limit ourselves to the precise construction set forth.

but consider that we are at liberty to make such changes and alterations as fairly come within the scope of the appended claims.

Having thus described our invention, what we claim as new and desire to secure by Letters Patent is:—

1. A machine of the character described including a movable yarn guide held in normal position by yarn passing therethrough; a record device and recording means, said yarn guide being automatically movable upon release of tension by the breaking of the yarn to effect the operation of said recording means to produce a record, of said breaking of the yarn, on said device; substantially as described.

2. A machine of the character described including a movable yarn guide held in normal position by yarn passing therethrough; recording means, said yarn guide being automatically movable upon release of tension by the breaking of the yarn to effect the operation of said recording means, said recording means including a chart; and means for making a mark on said chart; substantially as described.

3. A machine of the character described including a movable yarn guide held in normal position by yarn passing therethrough; recording means, said yarn guide being automatically movable upon release of tension by the breaking of the yarn to effect the operation of said recording means, said recording means including a chart; means for making a mark on said chart; and time-controlled means for moving said chart; substantially as described.

4. A machine of the character described including a movable yarn guide held in normal position by yarn passing therethrough; recording means, said yarn guide being automatically movable upon release of tension by the breaking of the yarn to effect the operation of said recording means, said recording means including a chart; and means for making a mark on said chart, said marking means being movable in one direction when the yarn guide moves due to the breaking of the yarn and being movable in the opposite direction when the guide is re-set to tie the broken yarn; substantially as described.

5. A machine of the character described including a movable yarn guide held in normal position by yarn passing therethrough; recording means, said yarn guide being automatically movable upon release of tension by the breaking of the yarn to effect the operation of said recording means, said recording means including a chart; means for making a mark on said chart, said marking means being movable in one direction when the yarn guide moves due to the breaking of the yarn and being movable in the opposite direction when the guide is re-set to tie the broken yarn; and time-controlled means for moving said chart; substantially as described.

6. A machine of the character described including a plurality of shafts; yarn guides connected to said shafts and operative when yarn is passing therethrough to hold said shafts in a predetermined position, said shafts being automatically rotatable, when said guides are released of the tension of said yarn, into another position; recording means; and means for moving said shafts, when in said second mentioned position, to effect the operation of said recording means; substantially as described.

7. A machine of the character described including a plurality of shafts; yarn guides connected to said shafts and operative when yarn is passing therethrough to hold said shafts in a predetermined position, said shafts being automatically rotatable, when said guides are released of the tension of said yarn, into another position; a marker; a chart; means for moving said shafts, when in said second mentioned position, to effect the movement of said marker upon said chart; and time-operated means for moving said chart in a direction transverse to the movement of said marker; substantially as described.

8. A machine of the character described including a plurality of shafts; yarn guides connected to said shafts and operative when yarn is passing therethrough to hold said shafts in a predetermined position, said shafts being automatically rotatable when said guides are released of the tension of said yarn, into another position, said shafts having projections thereon spaced apart within their lengths and positioned angularly with respect to the axes thereof; an oscillating shaft; a recording shaft; toothed wheels on the recording shaft respectively adjacent said first shafts; a worm on the recording shaft; a chart; a marker operatively connected to said worm and adapted to engage said chart; and means connected to said first shafts for respectively moving said toothed wheels when the shafts are moved lengthwise, said arms being adapted to reciprocate said first shafts lengthwise through the medium of said projections when the projections are alternately moved into the paths of said arms by the partial rotation of said shafts; substantially as described.

9. A machine of the character described including a plurality of shafts; yarn guides connected to said shafts and operative when yarn is passing therethrough to hold said shafts in a predetermined position, said shafts being automatically rotatable when said guides are released of the tension of said yarn, into another position, said shafts having projections thereon spaced apart within their lengths and positioned angularly with respect to the axes thereof; an oscillating shaft; a recording shaft; toothed wheels on the recording shaft respectively adjacent said first shafts; a worm on the recording shaft; a chart; a marker operatively connected to said worm and adapted to engage said chart; and means connected to said shafts for respectively moving said toothed wheels when the shafts are moved lengthwise, said arms being adapted to reciprocate said first shafts lengthwise through the medium of said projections when the projections are alternately moved in the paths of said arms by the partial rotation of said shafts, said projections having beveled portions, said arms being flexible laterally so as to be bent out of the path of said projections by the beveled surfaces thereof if the shafts are turned into their normal positions between the oscillation of said arms; substantially as described.

In testimony whereof we have signed our names to this specification in the presence of two subscribing witnesses.

STEPHEN A. GASDA.
DANIEL R. CAHILL.

Witnesses:
 GEORGE F. GASDA,
 BARTHOLOMEW J. O'BRIEN.